United States Patent
Martin et al.

[11] 3,719,629
[45] March 6, 1973

[54] WATER THINNABLE COATING COMPOSITIONS FROM AMINOETHYLATED INTERPOLYMERS

[75] Inventors: Patrick H. Martin, Lake Jackson; Russell T. McFadden, Freeport, both of Tex.

[73] Assignee: The Dow Chemical Corporation, Midland, Mich.

[22] Filed: March 31, 1971

[21] Appl. No.: 129,975

[52] U.S. Cl. ............. 260/33.2 EP, 260/29.6 HN, 260/29.6 NR, 260/33.4 EP
[51] Int. Cl. ...................... C08f 45/24, C08f 45/34
[58] Field of Search ......... 260/80.73, 86.1 N, 33.2 R, 260/29.6 NR

[56] References Cited

UNITED STATES PATENTS

| | | | |
|---|---|---|---|
| 3,228,823 | 1/1966 | Usala | 161/186 |
| 3,385,839 | 5/1968 | Honig | 260/80.73 |
| 3,372,149 | 3/1968 | Fertig | 260/86.1 N |
| 3,321,451 | 5/1967 | Gander | 260/80.73 |

Primary Examiner—Morris Liebman
Assistant Examiner—P. R. Michl
Attorney—Griswold & Burdick

[57] ABSTRACT

Water thinnable coating compositions are prepared by incorporating therein as the pigment binder an acidified aminoethylated copolymer having pendant amino-alkylate groups of the formula

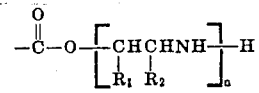

wherein $R_1$ and $R_2$ are independently selected from the group consisting of hydrogen and lower alkyl radicals of one to four carbon atoms and the average value of $n$ ranges from about 1.0 to 2.5 and wherein the copolymer before aminoethylation contains at least 3 percent by weight pendant —COOH groups.

Water dispersant epoxy resin coating compositions are also disclosed.

7 Claims, No Drawings

WATER THINNABLE COATING COMPOSITIONS FROM AMINOETHYLATED INTERPOLYMERS

BACKGROUND OF THE INVENTION

Gloss coatings, such as enamels, are generally deposited from an organo solvent system. The current water thinned coating compositions available today are derived from either latexes or water-soluble alkyds. Such compositions have generally exhibited problems either in application characteristics or in the poor appearance of the dried film. Consequently, enamel and other gloss coatings have continued to be deposited from oil systems. The disadvantages of oil coating systems are well known to anyone who has ever wielded a paint brush or roller. Not the least of those disadvantages is equipment, site and personal cleanup requiring liberal use of turpentine or similar odoriferous thinner. The widespread acceptance of aqueous coatings systems whenever available attests to their desirability in the minds of the painter.

Two package water dispersible epoxy coating compositions have been prepared employing polyamides as the curing agents. The coatings of the present invention exhibit better application properties such as faster tackfree drying properties and better coating properties such as better color, than do the coatings employing a polyamide as the curing agent.

SUMMARY OF THE INVENTION

The present invention provides water thinnable coating compositions by employing as the principal pigment binder an acidified aminoethylated interpolymer having pendant amino alkylate groups of the formula

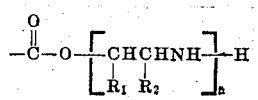

wherein $R_1$ and $R_2$ are independently selected from the group consisting of hydrogen and lower alkyl radicals of one to four carbon atoms and the average value of $n$ within the range of from about 1.0 to about 2.5, and wherein the interpolymer before aminoethylation contains at least about 3 percent and preferably more than 5 percent by weight pendant —COOH groups. The invention also contemplates the utilization of these acidified polymers in water miscible solvents in the formulation of a complete coating composition. The invention also contemplates the utilization of these acidified polymers in water dispersible epoxy resin coating compositions

DETAILED DESCRIPTION OF THE INVENTION

The aminoethylated interpolymers may be prepared according to methods disclosed in U.S. Ser. No. 840,795 filed July 10, 1969, by McFadden. In that disclosure it is taught that vinyl interpolymers containing pendant carboxyl groups may be prepared by the solution polymerization of a mixture of monomers one of which is a vinyl carboxylic acid monomer. The monomer mixture is polymerized in the presence of a catalyst and usually under controlled elevated temperatures with agitation until the polymerization reaction is complete. Various modifications commonly practiced with solution polymerization reactions can be utilized, modifications such as stepwise addition of the monomer mixture during the polymerization, incremental addition of catalyst, polymerization under an inert atmosphere, continuous or batch polymerization and the like. The details of such polymerization are well known and need not be discussed further herein.

The vinyl carboxylic acid monomers include the $\alpha,\beta$-ethylenically unsaturated monocarboxylic acids such as acrylic, methacrylic, cinnamic, crotonic acids and the like; unsaturated dicarboxylic acids such as maleic, fumaric, itaconic acids and the like; half esters of the unsaturated dicarboxylic acids cited above and mixtures thereof. Preferably the vinyl carboxylic acids are unsaturated monocarboxylic acids and most preferred are acrylic and methyacrylic acid.

The vinyl interpolymer is prepared by copolymerizing a vinyl carboxylic acid with one or more copolymerizable monomers such as vinyl aromatic monomers, alkyl esters of unsaturated monocarboxylic acids, dialkyl esters of unsaturated dicarboxylic acids, vinyl and vinylidene chloride and fluoride, N-vinyl pyrrolidone and the like.

Suitable vinyl aromatic monomers include styrene, $\alpha$-methylstyrene, vinyl toluene, the various alkyl substituted styrenes, the various halo substituted styrenes, vinyl naphthalene and the like. The more preferred of these monomers are styrene, $\alpha$-methylstyrene and vinyl toluene. Suitable alkyl esters of unsaturated mono- and dicarboxylic acids include the esters prepared from aliphatic alcohols containing from one to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Small amounts of acrylonitrile, less than about 10 percent, may also be used to improve the film properties.

The interpolymers preferred herein are those of styrene with one or more acrylate or methacrylate monomers and the vinyl carboxylic acid. In one preferred subgenus the styrene may constitute up to 60 weight percent of the monomers that are interpolymerized with the remainder of the acrylic monomer and the acid. Equally preferred are those interpolymers employing up to 90 weight percent of acrylic monomers.

The vinyl interpolymers are preferably prepared with a sufficient amount of vinyl carboxylic acid monomer to provide at least 3 percent and preferably from about 7.5 to about 12.5 percent by weight of carboxylic acid (as —COOH) and the balance of said interpolymer composed of the preferred comonomers as indicated above.

Suitable solvents for the polymerization include alcohols, ketones, aromatic hydrocarbons and the like or mixtures thereof. The polymerization temperature may range from 60° to 140°C., with a preferred range of 80° to 100°C. The particular temperature is variable depending on the monomers, the catalyst and other conditions.

The aminoethylated interpolymers employed in this invention are prepared by an amination reaction in which the vinyl carboxylic acid interpolymer in a suitable solvent is reacted with an excess of alkylenimine or an Ne(aminoalkyl) substituted alkylenimine. Suitable alkylenimines include the 1,2-alkylenimines such as ethylenimines such as ethylenimine, propylenimine, butylenimine and the like and mixtures thereof. Ethylenimine is readily available in commercial quantities and is preferred. Particularly useful are the N-(aminoalkyl) substituted alkylenimines since they react similarly to the alkylenimines with a carboxylic acid group but are less volatile than the alkylenimines. Exemplary of these compounds are N-(2-aminoethyl)aziridine, N-(3-aminopropyl)aziridine, N-(2-aminopropyl)propylenimine, N-(2-aminobutyl)butylenimine and the like. Particularly preferred are N-(2-aminoethyl)aziridine and N-(2-aminopropyl)propylenimine.

To obtain a plurality of amine groups per carboxylic acid group, at least 2 moles of an alkylenimine per equivalent of carboxylic acid are reacted with the organic solvent solution of the vinyl carboxylic acid interpolymer in order to obtain an average n value, according to the formula, of at least 1.0. Preferably, the number of moles of alkylenimine ranges from about 2 to about 5 giving an average n value of about 1.5 to 2.5. With the N-(aminoalkyl)alkylenimine, at least one mole, and preferably 1 to 1.5 moles, per equivalent of carboxylic acid is used.

The temperature of the amination reaction is best conducted above about 50°C. and preferably from about 50° to 100°C., although higher temperatures and superatmospheric pressures may be used. In contrast to these temperature conditions, the art suggests adding the imine at room temperature and keeping the temperature thereat for a period of time before heating the reaction mixture. The products produced thereby differ substantially in stability to the products of this invention and differ measurably in their amido nitrogen or unreacted acid content.

The aminoethylated interpolymers may also be prepared according to the teachings of Usala in U.S. Pat. No. 3,228,823 wherein from about 1 to about 2 moles of alkylene imine is added to the interpolymer containing pendant carboxyl groups at room temperature resulting in aminoethylated interpolymers having an average $n$ value of from about 1 to about 1.3. The aminoethylated interpolymers prepared in this manner exhibit considerably less shelf stability than those prepared according to McFadden; however, if the polymer is to be formulated into a coating and applied in a relatively short period of time, this presents no particular problem.

The reaction of the alkylenimine or the N-(amino-alkyl)alkylenimine with the carboxylic acid group is favored by nonprotic solvents such as ketones and aromatic hydrocarbons such as methyl ethyl ketone, xylene, toluene, ethylbenzene and the like, but a portion or all of the nonprotic solvent may be replaced by an alcohol. Suitable alcohols include aliphatic alcohols containing from two to five carbon atoms, lower alkylene glycols having from about one to about six carbon atoms, lower alkyl monoethers of ethylene and propylene glycols, diacetone alcohol and the like.

The amination reaction may be run in a solvent containing less than 20 percent by weight alcohol with the balance of the solvent comprising aromatic hydrocarbon solvents. After completion of the amination reaction, the solvent composition may be adjusted by solvent stripping to comprise from 30 to 100 percent by weight of an alcohol solvent and from 70 to 0 percent by weight of a nonprotic solvent, preferably a ketone or ether. Particularly preferred solvents include ethanol, propanol, isopropyl alcohol, isobutyl alcohol, n-butyl alcohol and the monomethyl ether of propylene glycol. The final product may have a polymer concentration from 1 to 60 percent by weight depending on the polymer solubility and the particular application.

The aminoethylated interpolymers are acidified by simple mixing of the interpolymer and acid in a suitable water miscible solvent of solvent blend. Among such solvents are the lower alkyl ethers of ethylene, propylene, dipropylene and like glycols representative of which are the butyl ether of propylene glycol, the ethyl ether of ethylene glycol, the propyl ether of diethylene glycol, and an isobutyl ether of mixed propylene glycols. Other solvents will be known.

The useful acids are those that will form an acid salt with the pendant amine moieties of the interpolymer. Preferably the acid should be volatile. Thus, typical of the preferred species are formic and acetic acids. The less volatile acids, such as glycolic acid, propionic acid, butyric acid and the like may be used but the water resistance of the resultant coating is impaired. Inorganic acids such as phosphoric acid may also be employed.

The acid may be used in an amount to neutralize all of the amine groups and may be employed in excess of that amount or less than that amount. The minimum level to be used is that which will impart water dispersibility to the acidified aminoethylated interpolymer.

The acidified polymers of this invention are utilizable as the pigment binder for coating compositions such as gloss enamels. Typically, such enamels will include the pigment binder, pigment, and a liquid dispersing medium. The enamels may also include other materials commonly employed in such compositions such as extender pigments, viscosity adjusting agents, preservatives and the like. In addition, the interpolymers of this invention may be used with epoxy resins to obtain cross-linked coatings exhibiting the desirable properties of such compositions.

Water dispersible or thinnable epoxy resin coatings can be prepared by mixing the acidified amino-ethylated interpolymers and the water-soluble aliphatic alcohol and glycol ether solvents discussed above with the desired epoxy resin.

The water dispersible epoxy resin compositions of this invention may be conveniently formulated as two package or component systems wherein one package comprises the acidified aminoethylated polymer, water miscible solvents, water and if desired, pigments, leveling agents, antifoam agents and other modifiers and the second package or component comprises the epoxy resin and, if desired, suitable water miscible solvents. When it is desired to apply the coating to the desired substrate, the contents of the two packages are blended together and the resultant mixture applied to the substrate by brushing, spraying and the like. The containers and applicator means are then easily cleaned-up by washing with water.

Suitable epoxy resins which may be employed in the water dispersible epoxy resin coating compositions of the present invention are the glycidyl ethers of polyhydric compounds which include, for example glycidyl ethers of phenols, bisphenols, phenol-aldehyde condensation products, glycols, polyoxyalkylene glycols and the like which may be exemplified by the following formulas, or mixtures of such glycidyl ethers.

III.

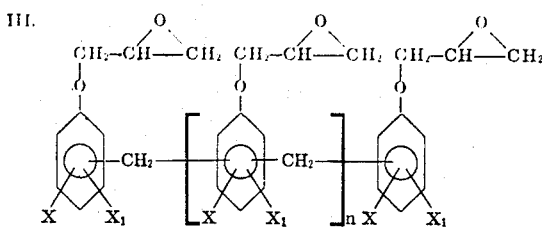

wherein X and $X_1$ are independently selected from hydrogen, chlorine, bromine and a lower alkyl group having from about one to about four carbon atoms;

IV.

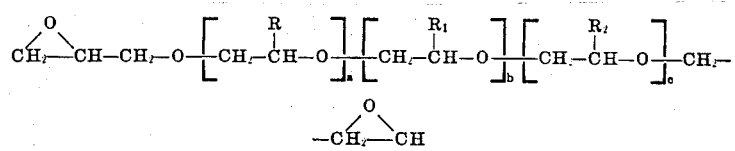

I.

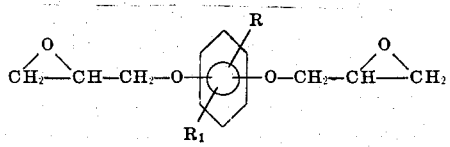

wherein R, $R_1$ and $R_2$ are independently hydrogen, an alkyl or haloalkyl group having from about one to about four carbon atoms and $a$, $b$ and $c$ are integers, the sum of which is an integer having an average value of from about 3 to about 40;

V.

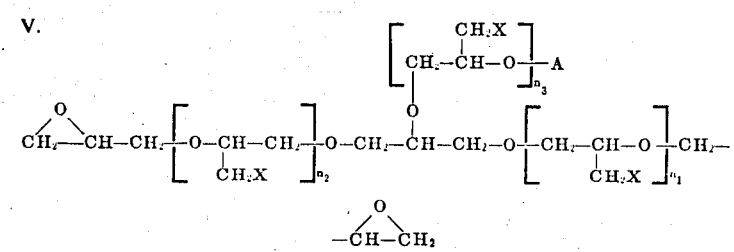

wherein R and $R_1$ are independently hydrogen, chlorine, bromine or a lower alkyl group having from about one to about four carbon atoms.

II.

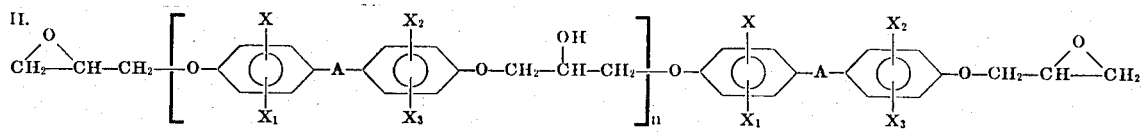

wherein A is a divalent radical selected from the group consisting of an alkylene group having from about one to about four carbon atoms, an alkylidene group having from about one to about four carbon atoms, a cycloalkylidene group, wherein $n_1$, $n_2$ and $n_3$ are integers, the sum of which is an integer having an average value of from about 0 to about 4, X is a halogen, i.e., chlorine, bromine or iodine, and A is hydrogen or the group

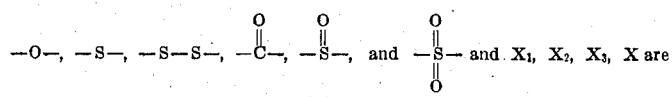

independently hydrogen, chlorine or bromine and wherein $n$ has an average value of from about 0 to about 15.

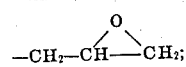

and

VI.

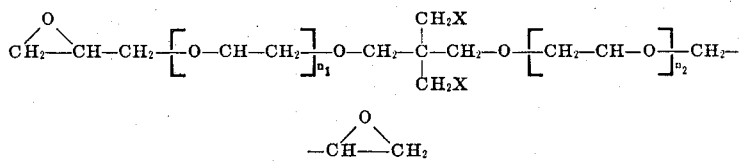

wherein $n_1$ and $n_2$ are integers, the sum of which is an integer from about 0 to about 4 and X is chlorine or bromine.

Other epoxy resins useful herein will be known to the skilled worker.

In addition to gloss and semi-gloss enamels the polymers may be employed in maintenance enamels, floor enamels, seamless flooring coatings, aircraft finishes, clear finishes and exterior house paint and trim enamels.

The coating compositions of this invention may be employed as formulated without pigments, or if colored coatings are desired, they may be added without detracting from the scope of the present invention.

Minor quantities of formulation additives such as levelers, antifoaming agents, other resinous materials, and the like may also be added to the compositions without detracting from the scope of the present invention.

The concept of the present invention is illustrated in the following examples wherein all parts and percentages are by weight.

In the examples, the following definitions and test procedures were employed:

I. Gloss was determined visually and rated according to the scale wherein "high gloss" means high visual gloss; "moderate gloss" means slight visual gloss; and "low gloss" means nearly flat.

II. Odor was determined by smell during painting with "high" meaning very objectionable; "moderate" meaning slightly objectionable; and "low" meaning not objectionable.

III. Brushability was determined by the resistance to brushing during hand brush painting of a surface with "difficult" meaning severe resistance to brushing or severe drag; "good" meaning slight resistance to brushing or slight to moderate drag; and "excellent" meaning very slight resistance to brushing or no significant drag.

IV. Rolling was evaluated with a hand roller over a large surface with "poor" meaning a poor wet edge and sagging bubbles; "good" meaning a good wet edge and and appearance and no dripping of paint and "excellent" meaning the same good wet edge but with improved appearance.

V. Dry time was the time period until the film was dry enough to handle without paint transferring to the hand.

VI. Clean up was the difficulty in cleaning up the paint equipment in water wherein "poor" means the brush can not be cleaned out; "good" means that the brush can be cleaned with slight effort and "excellent" means the brush cleaned out with very little effort.

VII. Water resistance refers to the resistance of the paint to a water spot test of 15 minutes to 1 hour after periods of dry from 18 hours to 7 days.

VIII. % Resin Solids — Approximately 1 gm. of polymer solution is accurately weighed into a tarred aluminum weighing pan and then heated at 150°C. until the pan and contents reach a constant weight.

% resin solids = (wt. of resinous residue × 100)/(wt. of solution)

IX. Viscosity (25°C.) Gardner — The polymer solution is poured into a Class V 10.75 mm. I.D., R.P.C. viscosity tube until the meniscus is level with the lower calibration. A cork is inserted to the upper calibration and the tube in inverted in a 25°C. chamber. After 40 minutes the tube is quickly inverted and the time required (average of three determinations) for the bubble to touch the cork is measured.

X. Amine Equivalent Weight — A 4–5 gm. sample of solution is weighed into a polyethylene beaker and dissolved in 50 ml. of isopropanol. The solution is then titrated potentiometrically with 1.0 NHCl. The amine equivalent weight is

[(wt. of sample) × (% resin solids) × 1000]/[(meq. of 1.0 NHCl to end point)]

XI. Amine Hydrogen Equivalent Weight — A weighed sample of polymer solution is reacted with an excess of phenyl glycidyl ether (PGE) as a 5% solution in glycol monoethyl ether by refluxing for 1 hour. To the hot solution is added an aliquot of hydrochlorination reagent (35 ml. conc. HCl 250 ml. of pyridine and 750 ml. of glycol monoethyl ether) and the mixture is refluxed for 40 minutes more. After cooling the remaining pyridinium chloride is titrated with 0.2 NKOH in ethanol to a cresol red endpoint. The amine hydrogen equivalent weight is given by [(wt. of sample) × (% resin solids) × 1000]/[(meq. of KOH) + (meq. of PGE) − (meq. of hydrochlorinating reagent)]

EXAMPLE 1

A. Preparation of a Polyaminoacrylate Resin in a Water-soluble Solvent

A 5-liter glass reactor was fitted for stirring, temperature control, reflux, nitrogen purging, and continuous monomer addition. To it was charged 1650 grams of isopropanol, and with stirring this was heated to 82°–83 °C. The following mixture was then added continuously over a 2 hour period: styrene, 298 grams; methyl methyacrylate, 297 grams; butyl acrylate, 297 grams; methacrylic acid, 105 grams; and azobis(isobutyronitrile), 10.0 grams. The mixture was stirred at 80°C. for 16 hours, then 2.50 grams of addition azobis(isobutyronitrile) was added and heating was continued for three more hours. At this time the solution contained 37.5 percent solids (calculated, 37.8 percent). Next, 105 grams of ethylenimine was added to the solution at 78°–82°C. over a 12 minute period. After it had been stirred at 80°C. for an additional 1 ½ hours at 80°C., the polyaminoethylated solution was heated to boiling and 755 grams of distillate was collected by means of a simple distillation head. The solution was diluted with 100 grams of ethyl acetate and cooled to 25°C. It had the following properties.

| | |
|---|---|
| % Solids | 54.2 |
| Viscosity, cps | 2600 |
| Appearance | Clear, light yellow |
| Amine equivalent weight | 790 |
| Amine hydrogen equivalent wt. | 530 |
| Residual ethylenimine, wt. % | 0.75 |

On the basis of the above data, the $n$ value for the polyaminoacrylate ester was 1.75 where $n$ is

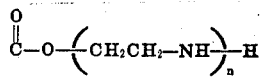

or, $n$ is the average number of imine units reacted on each carboxyl group in the original polymer.

B. A paint was formulated with the following composition:

| | |
|---|---|
| Polymer of A above | 525 parts |
| Glycolic Acid | 76 parts |
| Methyl ether of diethylene glycol | 150 parts |
| Titanium dioxide | 300 parts |
| n-Propyl alcohol | 150 parts |

The formulation was thoroughly mixed and brushed on a wood surface. Gloss was rated high; odor—very low; brushability was difficult; water resistance for a 15 minute spot after 2 days drying was good and for a 30 minute spot after 16 days drying was good. Clean up of the brush and paint equipment with water was good.

EXAMPLE 2

A. Preparation of a Polyaminoacrylate Resin for Formulation as an Exterior Trim Enamel The following weights of reactants and solvents were used to prepare a copolymer as in Example 1: isopropanol, 1,495 grams; methyl methacrylate, 375 grams, butyl acrylate, 750 grams; methacrylic acid, 185 grams; azobis(isobutyronitrile), 13 grams; ethylenimine, 185 grams; and ethylene glycol monoethyl ether, 1,000 grams. During the distillation step, 1,900 milliliters of liquid was collected.

Solution Properties:

| | |
|---|---|
| % Solids | 58.0 |
| Viscosity | 3700 |
| Appearance | Clear, light yellow |
| Amine equivalent weight | 840 |
| Amine hydrogen equivalent wt. | 563 |
| Residual ethylenimine, wt. % | 0.12 |

The calculated $n$ value was 1.33.

B. An exterior trim enamel was formulated with the following composition

| | |
|---|---|
| Polymer of A | 420 grams |
| Formic acid | 20 grams |
| Methyl ether of dipropylene glycol | 60 grams |
| n-Propyl alcohol | 200 grams |
| Titanium dioxide | 300 grams |
| Anhydrous and particulate colloidal silica sold as Cab-O-Sil M–5 | 5 grams |

The formulation was thoroughly mixed and brushed on an exterior wood surface. Leveling properties were considered excellent; gloss was rated high; water resistance for a 15 minute spot test after overnight drying showed a slight softening and clean up of the brush with water was excellent.

EXAMPLE 3

A. In a 3 gallon glass reactor, the following mixture was polymerized in 3,600 grams of isopropanol: styrene, 1030 grams; methyl methacrylate, 1,025 grams; butyl acrylate, 1,030 grams; methacrylic acid, 460 grams; and azobis(isobutyronitrile), 29 grams. The polymerization was carried out at 82°–84°C. for 22 hours, then 460 grams of ethylenimine was added at 81°–82C. and heating was continued for 4 hours. 3,615 Grams of liquid was distilled, during which a mixture of 1,325 grams of propylene glycol monomethyl ether and 1,220 grams of n-propanol was added.

Solution Properties:

| | |
|---|---|
| % Solids | 60.5 |
| Viscosity, cps | 15,600 |
| Appearance | Clear, yellow |
| Amine equivalent weight | 906 |
| Amine hydrogen equivalent wt. | 566 |
| Residual ethylenimine wt. % | 0.02 |

The calculated $n$ value was 1.26.

B. A paint was formulated from the following composition:

| | |
|---|---|
| Polymer of A | 83.2 grams |
| n-Propyl alcohol | 72 grams |
| Formic acid | 3 grams |
| Titanium dioxide | 50 grams |
| Methyl ether of dipropylene glycol | 10 grams |

The formulation was mixed and sprayed onto cold rolled steel. The coating exhibited high gloss, low odor and excellent adhesion to the steel. Clean up of equipment with water was excellent.

EXAMPLE 4

A. Preparation of a Polyaminoacrylate Resin Containing Water and Formic Acid

The following components were reacted essentially as in Example 3: isopropanol, 3,800 grams; butyl acrylate, 1,785 grams; methyl methacrylate, 1,785 grams; styrene, 1,785 grams; methacrylic acid, 800 grams; azobis(isobutyronitrile) 10.0 grams; and ethylenimine, 800 grams. The isopropanol was replaced with 2,000 grams of propylene glycol monomethyl ether and 2,000 grams of n-propanol, then the solution was further diluted with a mixture of 605 grams of 91 percent formic acid and 430 grams of water.

Solution Properties:

| | |
|---|---|
| % Solids | 55.5 |
| Viscosity, cps | 16,200 |
| Appearance | Clear, yellow |
| Amine equivalent weight | 1040 |
| Amine hydrogen equivalent wt. | 640 |

The calculated $n$ value was 1.25. The polymer solution was completely miscible with water.

B. A paint was formulated from the following composition:

Part 1

| | |
|---|---|
| Polymer of A | 300 grams |
| Monomethyl ether of dipropylene glycol | 125 grams |
| Monoethyl ether of ethylene glycol | 50 grams |
| Titanium dioxide | 175 grams |
| Chrome oxide green | 100 grams |
| Water | 268 grams |
| Anhydrous and particulate colloidal silica sold as Cab-O-Sil M-5 | 30 grams |

Part 2

| | |
|---|---|
| N-propylalcohol | 80 grams |
| Diglycidyl ether of bisphenol A (E.E.W.* = 186–192) | 105 grams |
| Monoisobutyl ether of a mixture of mono- and di-propylene glycols (sold as Dowanol PIB-T) | 30 grams |

*E.E.W. = Epoxy equivalent weight

Part 1 was formulated by mixing the polymer, water, titanium dioxide and Cab-O-Sil in a Waring Blendor for 5 minutes. The remaining ingredients were then added. Part 2 was prepared by mixing the three ingredients. Parts 1 and 2 were blended just before use.

The resulting paint was brushed on the steel surface of a piece of mechanical equipment with excellent flow and final appearance. It had good brushability and clean up was fair. Gloss was medium and the coating had a moderate alcohol odor.

EXAMPLE 5

A. Preparation of a Polyaminoacrylate Resin Using an N-Substituted Aziridine

The following mixture was polymerized in ethyl alcohol at 75°–80°C. for 8 hours: butyl acrylate, 218 grams; methyl methacrylate, 150 grams; methacrylic acid, 50 grams; and azobis(isobutyronitrile), 4.18 grams. With the resulting polymer solution at 75°C., 82 grams of N-ethyl aziridine was added and allowed to react for 2 ½ hours. During this time the solids content rose from 45.8 percent to 50.0 percent. The ethanol was distilled and replaced with 250 grams of propylene glycol monomethyl ether. The solution was then neutralized by adding 132 grams of a 50 percent solution of acetic acid in water. This rendered the solution fully water-soluble. The solution had an amine equivalent weight of 1,614 on a liquid basis.

B. A paint was formulated from the following composition:

| | |
|---|---|
| Polymer of A | 511 grams |
| Monomethyl ether of dipropylene glycol | 100 grams |
| Monoethyl ether of ethylene glycol | 25 grams |
| Titanium dioxide | 250 grams |
| Zinc oxide | 50 grams |
| 2,3,5,6-Tetrachloro-4-methyl sulfonyl pyridine | 5 grams |

The ingredients were mixed and the resulting paint brushed on the siding of a house. Brushability and leveling was excellent. The coating had moderate gloss with poor water resistance. Clean up in water was excellent.

EXAMPLE 6

A. Preparation of a Polyaminoacrylate Resin Using N(2-Aminoethyl)Aziridine

The following mixture was polymerized at 80°–85°C. for 8 hours in a mixture of 386 grams of propylene glycol monomethyl ether and 130 grams of dipropylene glycol monomethyl ether: butyl acrylate, 178 grams; methylmethacrylate, 178 grams; styrene, 178 grams; methacrylic acid, 80 grams; and azobis(isobutyronitrile), 10 grams. The resulting polymer solution was a thick, water-white syrup. To it, at 80°–85°C., was added 84 grams of 98 percent pure N(2-aminoethyl)aziridine. The mixture was stirred for 3 hours at 85°C., and then had an amine equivalent weight of 790. With the solution still at 80°C., a solution of 90 grams of 91 percent formic acid and 100 grams of water was added slowly and stirred in.

Solution Properties:

| | |
|---|---|
| % Solids | 50.0 |
| Appearance | Clear, colorless |
| Amine equivalent weight | 1090 |
| Amine hydrogen equivalent wt. | 702 |

The calculated $n$ value was 1.30.

B. A paint was formulated from the following composition:

Part 1

| | |
|---|---|
| Polymer of A | 200 grams |
| Methyl ether of propylene glycol | 30 grams |
| Methyl ether of dipropylene glycol | 75 grams |
| Titanium dioxide | 275 grams |

The above ingredients were dispersed in a Waring Blendor and thereafter was added:

| | |
|---|---|
| Polymer of A | 100 grams |
| n-Propyl alcohol | 100 grams |
| Water | 268 grams |
| Monoethyl ether of ethylene glycol | 40 grams |

This was thoroughly mixed to complete formulation of Part 1.

A Part 2 was prepared by mixing 105 parts of the diglycidyl ether of bisphenol A (E.E.W. = 186–192) and 30 parts of the monomethyl ether of propylene glycol.

Immediately before use, Parts 1 and 2 were blended to form a paint. This was brushed on a substratum with poor brushability and fair clean up in water.

EXAMPLE 7

A. Preparation of a Higher Functionality Polyaminoacrylate Resin

The following mixture was polymerized at 90°–100°C. for 3 ½ hours in 500 grams of n-propanol: styrene, 230 grams; methyl methacrylate, 230 grams; butyl acrylate, 230 grams; methacrylic acid, 155 grams and azobis(isobutyronitrile), 17 grams. At the end of this time the solution contained 61.7 percent solids, or 98 percent of the calculated amount. The solution diluted with 220 grams of propylene glycol monomethyl ether, and with the solution at 80°–84°C. 155 grams of 99 percent pure N(2-aminoethyl)aziridine was added over a 20 minute period, followed by 100 grams of distilled water. The clear solution was stirred overnight at ambient temperature, and the next morning 100 grams of 91 percent formic acid and 84 grams of water were added and stirred in.

Solution Properties:

| | |
|---|---|
| % Solids | 50 |
| Appearance | Clear, yellow |
| Amine equivalent weight | 672 |
| Amine hydrogen equivalent weight | 400 |

The calculated $n$ value was 1.60.

B. A paint was formulated from the following composition. Part 1 was prepared by blending 5 minutes on a Waring Blendor.

| | |
|---|---|
| Polymer of A | 200 grams |
| Monomethyl ether of dipropylene glycol | 25 grams |
| Monoethyl ether of ethylene glycol | 30 grams |
| Water | 200 grams |
| Titanium dioxide | 250 grams |

After blending there was added:

| | |
|---|---|
| Water | 200 grams |
| Polymer of A | 150 grams |
| Monoethyl ether of ethylene glycol | 30 grams |
| Isopropyl alcohol | 30 grams |

Part 2 was prepared by mixing

| | |
|---|---|
| Diglycidyl ether of bisphenol A (E.E.W. = 186–192) | 120 grams |
| Monoethyl ether of ethylene glycol | 30 grams |
| Isopropyl alcohol | 20 grams |

Just before use, the paint was made by blending Parts 1 and 2. The paint was brushed on a surface with good brushability. The resulting coating had high gloss and low odor. Drying time was about 30 minutes. Clean up in water was excellent.

EXAMPLE 8

A. Recipe:

| | |
|---|---|
| N-propanol | 500 grams |
| Styrene | 200 grams |
| Butyl acrylate | 200 grams |
| Methyl methacrylate | 200 grams |
| Methacrylic acid | 200 grams |
| Azobis(isobutyronitrile) | 16 grams |
| 2-Aminoethylaziridine | 200 grams |
| Monoethyl ether of ethylene glycol | 190 grams |
| Water | 500 grams |
| 88% Formic acid | 130 grams |

The monomer/catalyst mixture was added to the n-propanol at 80°C. over a 43 minute period. The temperature rose to 103°C. due to the exothermic polymerization. The mixture was stirred at 90° for 3 hours more, and then contained 58.2 percent solids. It was cooled to 80° and the ethylene glycol, ethyl ether was added. Then the aminoethyl aziridine was added dropwise at 80°C. over a 30 minute period, then 100 grams water were added and stirred overnight to cool. The next morning the formic acid and 400 grams of distilled water were added.

B. Part 1 of a composition was prepared by dispersing the following ingredients for 5 minutes in a Waring Blendor.

| | |
|---|---|
| Polymer of A | 115 grams |
| Water | 150 grams |
| Titanium dioxide | 300 grams |
| Aromatic 100 solvent | 5 grams |
| Chrome oxide green | 30 grams |
| Anhydrous and particulate colloidal silica sold as Cab-O-Sil M-5 | 10 grams |

Thereafter was added:

| | |
|---|---|
| Polymer of A | 200 grams |
| Water | 250 grams |
| Propylene glycol | 100 grams |

Part 2 consisted of 210 grams of a liquid diglycidyl ether of bisphenol A (epoxy equivalent weight = 189 and a viscosity of about 12,500 cps at 25°C.).

Just before use, the paint was made by blending Parts 1 and 2. The resulting composition was brushed and rolled on a wall surface with good brushability and excellent roll properties. Drying time was 16 hours and exhibited excellent wet edge. The dried coating showed medium gloss, low odor and had excellent hardness and appearance. Clean up in water was excellent.

Example 9

A. Recipe:

| | |
|---|---|
| N-Propanol | 1500 grams |
| Styrene | 690 grams |
| Methyl methacrylate | 690 grams |
| Butyl acrylate | 690 grams |
| Methacrylic acid | 464 grams |
| Azobis(isobutyronitrile) | 51 grams |
| 2-Aminoethylaziridine | 465 grams |
| n-Propanol | 580 grams |
| Water | 590 grams |
| Acetic acid | 345 grams |

The polymerization and reaction procedure was that of Example 8.

50% solids
Amine equivalent wt. 666
Amine hydrogen equivalent wt. 302
Gardner viscosity $Z_4$–$Z_5$
Gardner Color 3
Calculated $n$ value was 1.61.

The viscosity of the composition was reduced with water and at 25 percent nonvolatiles had a Gardner viscosity of 75 seconds; at 20 percent nonvolatiles a viscosity of 25 seconds; and at 18 percent nonvolatiles a viscosity of about 5 seconds.

B. A semi-gloss enamel was formulated from the polymer of A by forming a pigment dispersion of a Waring Blendor form.

| | |
|---|---|
| Polymer from A | 115 grams |
| Water | 150 grams |
| Titanium dioxide rutile | 300 grams |
| Anhydrous and particulate colloidal silica sold as Cab-O-Sil M-5 | 10 grams |

After dispersion, 5 grams of a slow evaporating organic solvent sold as Aromatic 100 solvent was added to reduce the foam. Then 233 grams of polymer from A, 275 grams water and 50 grams propylene glycol were added.

A Part 2 was formed by mixing 200 grams of the diglycidyl ether of bisphenol A and 10 grams of the monomethyl ether of propylene glycol.

Just before use, Part 2 was added to the pigment dispersion and stirred until uniformly mixed.

The enamel was applied on aluminum panels with a number 60 wire wound rod and baked for 15 minutes at 275°F. Spot tests with various chemicals were run and evaluated after 15 minutes exposure. No effect on the cooling was seen with xylene, tetrahydrofuran, glacial acetic acid or 10 percent sodium hydroxide. A slight softening was seen with methyl ethyl ketone. Immersion of a coated panel in Skydrol, a hydraulic fluid used for airplanes, for 24 hours showed no affect on the coating.

Coated panels which had been air dried for 1 week without baking showed excellent abrasion resistance when scratched with a fingernail.

The enamel was painted on dry wall board and the coating subjected to a 5 minute spot test with various chemicals. Resistance was excellent with water, acetic acid, 5 percent caustic, xylene and methyl ethyl ketone. The coatings were smeared with crayon, pen, pencil, lipstick and heel marks. Clean up in each instance was excellent.

The application properties of the enamel showed slight to moderate brush drag; roller application was excellent, the wet edge was adequate to roller coat a typical bedroom, the coating was tack free in about 2 hours. Leveling was excellent. The coating had a low odor. Clean up in water was excellent. The enamel exhibited a package stability of about 2 days.

Coatings of various proportions of the diglycidyl ether of bisphenol A to 100 parts of part 1 were prepared. These were coated on aluminum panels with a number 60 wire wound rod and baked for 15 minutes at 275°F. The coated panels were exposed for 5 minutes to methyl ethyl ketone and to tetrahydrofuran. Other panels were bent around a mandrel. Reverse impact tests were run on other panels. The results are in the following table.

| Parts Per Hundred Parts of Polymer A | | | | | | |
|---|---|---|---|---|---|---|
| | 0 | 20 | 40 | 60 | 80 | 100 |
| 5'MEK | Softened | Softened | Softened | No effect | No effect | No effect. |
| 5'THF | do | do | do | do | do | Do. |
| Mandrel | Fair | OK | OK | OK | OK | OK. |
| Reverse impact | Fail 20 | Pass 40 | Pass 30 | Pass 40 | Fail 20 | Fail 20. |

EXAMPLE 10

A. Recipe:

| | |
|---|---|
| Isopropanol | 3800 grams |
| Butyl acrylate | 1785 grams |
| Methyl methacrylate | 1785 grams |
| Styrene | 1785 grams |
| Methacrylic acid | 800 grams |
| Azobis(isobutyronitrile) | 100 grams |
| Ethylenimine | 800 grams |
| Propylene glycol: methyl ether | 2215 grams |
| n-Propanol | 2215 grams |

The i-propanol was brought to 80°C. and the monomer/catalyst solution was added in 1,000 gram lots each hour. The polymer solution was stirred overnight at 80°C., and then contained 59.9 percent solids. With the solution at 75°–80°C., the ethylenimine was added over a ½ hour period, and the solution was stirred for two hours more at 80°C., at which time it contained 62.6 percent solids. The propylene glycol: methyl ether was added and 4,000 grams of liquid was distilled. Then the n-propanol was stirred in and the solution was cooled. 605 Grams of 90 percent formic acid was added, and the solution was bottled.

| | |
|---|---|
| % Solids | 55.0 |
| Viscosity | 15,000 cps |
| Amine equivalent wt. | 975 |
| Amine hydrogen equiv. wt. | 590 |

Calculated $n = 1.33$

B. Part 1 of a formulation was prepared by blending:

| | |
|---|---|
| Polymer of A | 326 grams |
| Titanium dioxide | 150 grams |
| n-Propyl alcohol | 110 grams |
| Water | 110 grams |
| Chrome oxide green | 100 grams |

Part 2 was made by mixing:

| | |
|---|---|
| Diglycidyl ether of bisphenol A (E.E.W. = 186–192) | 101 grams |
| Monoethyl ether of ethylene glycol | 30.2 grams |
| n-Propyl Alcohol | 160 grams |

Parts 1 and 2 were blended to form a paint. The viscosity was reduced with a 90/10 water/NaOH solution to a value of 20 seconds with a number 4 Ford Cap.

The paint was sprayed on a surface and gave excellent gloss when dry. Water resistance for a 5 minute spot test after 6 days drying was slightly softened. Clean up in water was excellent.

EXAMPLE 11

A. Recipe:

| | |
|---|---|
| n-Propanol | 725 grams |
| Styrene | 180 grams |
| Butyl acrylate | 180 grams |
| Methyl methacrylate | 180 grams |
| Methacrylic acid | 80 grams |
| Azobis(isobutyronitrile) | 10 grams |
| Ethylenimine | 80 grams |
| Monomethyl ether of dipropylene glycol | 250 grams |
| 91% Formic acid water | 43 grams |

The monomer/catalyst mixture was polymerized for 20 hours at 80°C. in the n-propanol, giving a solution containing 45.6 percent solids. The ethylenimine was added at 80° and digested for 2 hours, giving 46.6 percent solids. The dipropylene glycol:monomethyl ether was added and 565 grams of n-propanol were distilled. The solution was cooled and the water and formic acid were stirred in.

| | |
|---|---|
| % Solids | 55.3 |
| Amine equivalent int. | 850 |
| Amine hydrogen eq. wt. | 552 |

Calculated $n = 1.57$

B. A paint was prepared by blending Parts 1 and 2 identified as follows:

Part 1 was made by dispersing the following ingredients for 5 minutes in a Waring Blendor.

| | |
|---|---|
| Polymer of A | 300 grams |
| Monomethyl ether of propylene glycol | 100 grams |
| n-Propyl alcohol | 70 grams |
| Water | 268 grams |
| Titanium dioxide | 275 grams |

Part 2 was prepared by mixing 105 grams of the diglycidyl ether of bisphenol A (E.E.W. = 186–192) and 30 grams of the monomethyl ether of propylene glycol.

The parts were blended just prior to use and the paint brushed on a surface with good brushability. Drying time was fair. The coating had excellent gloss, very low odor and the hardness after several days air dry was excellent. Clean up in water was excellent.

In like manner, the benefits of the invention are obtained with other polymers containing up to 60 weight percent styrene and up to 20 weight percent of acrylic or methyacrylic acid with the remainder of a lower alkyl acrylate. A similar result obtains when the interpolymer is one of up to 90 weight percent of an alkyl acrylate with the remainder of a vinyl carboxylic acid.

What is claimed is:

1. A water thinnable coating composition comprising (1) a water miscible solvent, (2) an acidified aminoethylated vinyl polymer dissolved in said solvent, said interpolymer having pendant aminoethyl groups of the formula

wherein $R_1$ and $R_2$ are independently selected from the group consisting of hydrogen and lower alkyl radicals of one to four carbon atoms and the average value of $n$ ranges from about 1.0 to about 2.5 and wherein the interpolymer before aminoethylation contains at least 3 percent by weight pendant —COOH groups and further wherein said aminoethyl groups are reacted with sufficient acid to impart water solubility to said interpolymer and (3) an epoxy resin.

2. The composition of claim 1 wherein the average value of $n$ is from about 1.5 to about 2.5.

3. The composition of claim 1 wherein the interpolymer before aminoethylation contains from about 5 to about 15 percent by weight pendant —COOH groups.

4. The composition of claim 1 wherein the water miscible solvent is selected from the group consisting of aliphatic alcohols having from about one to about six carbon atoms, glycols, glycol monoethers and mixtures thereof.

5. The composition of claim 1 wherein said epoxy resin is a glycidyl ether of a polyhydric compound.

6. The composition of claim 5 wherein the polyhydric compound is a bisphenol.

7. The composition of claim 6 wherein the bisphenol is bisphenol A.

* * * * *